(12) United States Patent
Lee et al.

(10) Patent No.: US 6,984,103 B2
(45) Date of Patent: Jan. 10, 2006

(54) TRIPLE CIRCUIT TURBINE BLADE

(75) Inventors: Ching-Pang Lee, Cincinnati, OH (US); Steven Robert Brassfield, Cincinnati, OH (US); Chander Prakash, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 227 days.

(21) Appl. No.: 10/718,465

(22) Filed: Nov. 20, 2003

(65) Prior Publication Data
US 2005/0111977 A1 May 26, 2005

(51) Int. Cl.
F03D 11/00 (2006.01)
(52) U.S. Cl. .................... 415/115; 415/116; 416/95; 416/96 R; 416/97 R
(58) Field of Classification Search ............... 415/115, 415/116; 416/95, 96 R, 96 A, 97 R
See application file for complete search history.

(56) References Cited

U.S. PATENT DOCUMENTS

| | | | |
|---|---|---|---|
| 5,156,526 A | 10/1992 | Lee et al. | |
| 5,165,852 A | 11/1992 | Lee et al. | |
| 5,387,085 A | 2/1995 | Thomas et al. | |
| 5,591,007 A | 1/1997 | Lee et al. | |
| 5,660,524 A | 8/1997 | Lee et al. | |
| 5,690,472 A | 11/1997 | Lee | |
| 5,813,835 A | 9/1998 | Corsmeier et al. | |
| 5,931,638 A | 8/1999 | Krause et al. | |
| 5,967,752 A | 10/1999 | Lee et al. | |
| 6,174,135 B1 | 1/2001 | Lee et al. | |
| 6,254,334 B1 | 7/2001 | Lafleur | |
| 6,402,470 B1 | 6/2002 | Kvasnak et al. | |
| 6,514,042 B2 | 2/2003 | Kvasnak et al. | |
| 6,832,889 B1 * | 12/2004 | Lee et al. ................... | 415/115 |

* cited by examiner

*Primary Examiner*—Edward K. Look
*Assistant Examiner*—Dwayne White
(74) *Attorney, Agent, or Firm*—William S. Andea; Francis L. Conte

(57) ABSTRACT

A turbine blade includes an airfoil having pressure and suction sidewalls extending between leading and trailing edges, and from root to tip. A dovetail is joined to the airfoil root at a platform. Three internal cooling circuits extend in span inside the airfoil, and each circuit includes a respective inlet channel commencing in axially adjacent alignment in the dovetail. The inlet channels twist together from the dovetail, through the platform, and into the airfoil behind the leading edge in transverse adjacent alignment across the sidewalls.

25 Claims, 4 Drawing Sheets

TRIPLE CIRCUIT TURBINE BLADE

The U.S. Government may have certain rights in this invention pursuant to contract number F33615-02-C-2212 awarded by the U.S. Department of the Air Force.

BACKGROUND OF THE INVENTION

The present invention relates generally to gas turbine engines, and, more specifically, to turbine blade cooling therein.

In a gas turbine engine air is pressurized in a compressor and mixed with fuel in a combustor for generating hot combustion gases. Turbines are used to extract energy from the gases and power the compressor while producing useful output power such as driving an upstream fan in an aircraft turbofan gas turbine engine application.

Engine efficiency may be maximized by maximizing the temperature of the combustion gases, but the high combustion gas temperature will limit the useful life of the various turbine components exposed to the combustion gases during operation.

The first stage turbine rotor blade receives the hottest combustion gases from the upstream turbine nozzle in the high pressure turbine (HPT). These blades have dovetails mounted in corresponding dovetail slots in the perimeter of a supporting rotor disk, and airfoils extend outwardly from a flow boundary platform mounted on the dovetails.

The turbine airfoils are hollow and include various internal cooling circuits therein having respective inlets extending through the platform and dovetail for receiving cooling air from the base of the dovetail mounted in the dovetail slots. The cooling air is typically compressor discharge air having maximum pressure, along with maximum temperature due to the compression process.

The typical operating cycle for an aircraft turbofan engine includes takeoff, climb, cruise, descent, and landing during which thrust reverse operation is temporarily effected. Maximum power operation of the engine is typically effected during takeoff during which the turbine rotor inlet temperature may reach a corresponding maximum value, along with a corresponding maximum temperature for the compressor discharge air.

The cooling circuits for the first stage turbine blades may therefore be designed for this maximum temperature condition during takeoff, which condition is transient and of relatively short duration.

Accordingly, state-of-the-art superalloy materials, typically nickel or cobalt based, are used in the casting of the first stage turbine rotor blades for maximizing their strength at elevated temperature and ensuring their durability and long useful life. Correspondingly, the airfoil cooling circuits may be configured in a myriad of permutations for maximizing the cooling effectiveness of the hot compressor discharge air in the different regions of the airfoil subject to different heating loads from the combustion gases which flow with different pressure and temperature distributions around the opposite pressure and suction. sides of the airfoil.

The compressor discharge air typically used for cooling the airfoil is initially channeled inside the hollow airfoil and is then discharged through various rows of aperture outlets in the pressure and suction sides thereof. The compressor discharge air has maximum pressure and is used to ensure a suitable backflow margin at the various outlets in the turbine airfoils. The combustion gases decrease in pressure as they flow downstream over the leading and trailing edges of the airfoils, and sufficient backflow margin must be provided along the airfoil leading edge wherein the local pressure of the combustion gases is relatively high.

A typical backflow margin requires that the pressure of the cooling air in the airfoil exceed the local pressure of the combustion gases outside thereof by about five to fifty percent. In this way, the combustion gases are not back-ingested into the airfoil through the outlets for maintaining proper cooling effectiveness of the internal circuits.

As the combustion gases decrease in pressure to the trailing edge of the airfoil, the local backflow margin correspondingly increases due to the relatively high pressure of the compressor discharge air channeled into the airfoils. Excess backflow margin is not desirable since it leads to blow-off or lift-off of the spent cooling air as it is discharged from the outlet holes in typical film cooling configurations.

The airfoil internal cooling circuits are therefore typically tailored for the different operating conditions between the leading and trailing edges of the airfoil. The leading edge cooling circuit typically provides internal impingement cooling of the back side of the leading edge followed by discharge of the spent impingement air through various rows of film cooling holes around the airfoil leading edge.

The trailing edge cooling circuit typically includes either centerline or pressure-side outlet holes along the trailing edge fed from an internal radial channel. The middle or mid-chord region of the airfoil typically includes a multi-pass serpentine circuit having radial legs through which the cooling air is channeled and absorbs heat prior to discharge through various outlet apertures.

The various internal cooling circuits typically include elongate turbulators or ribs extending along the pressure and suction sidewalls of the airfoil for increasing the heat transfer capability of the cooling air. The turbulators and specific configurations of the cooling circuits introduce pressure losses or pressure drops in the cooling air prior to discharge from the various outlets.

In an advanced turbofan gas turbine engine being developed for small commercial business jets or military applications, the core engine is being designed to operate substantially continuously at very high compressor discharge temperature and correspondingly high turbine rotor inlet temperature for extended periods of time. In contrast with conventional turbofan engines having turbine blades designed for transient takeoff temperature conditions, the advanced turbofan engine requires turbine cooling configurations designed for long duration high temperature conditions.

Accordingly, the turbine blades require a substantially lower bulk temperature during normal operation than required for typical turbofan engines. The requirement for lower bulk temperature of the turbine airfoils therefore requires improved cooling circuits which better maximize the cooling effectiveness of the correspondingly high temperature compressor discharge air.

It is therefore desired to provide a turbine blade having an improved cooling configuration therein for effecting a lower bulk temperature during operation.

BRIEF DESCRIPTION OF THE INVENTION

A turbine blade includes an airfoil having pressure and suction sidewalls extending between leading and trailing edges, and from root to tip. A dovetail is joined to the airfoil root at a platform. Three internal cooling circuits extend in span inside the airfoil, and each circuit includes a respective inlet channel commencing in axially adjacent alignment in the dovetail. The inlet channels twist together from the dovetail, through the platform, and into the airfoil behind the leading edge in transverse adjacent alignment across the sidewalls.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
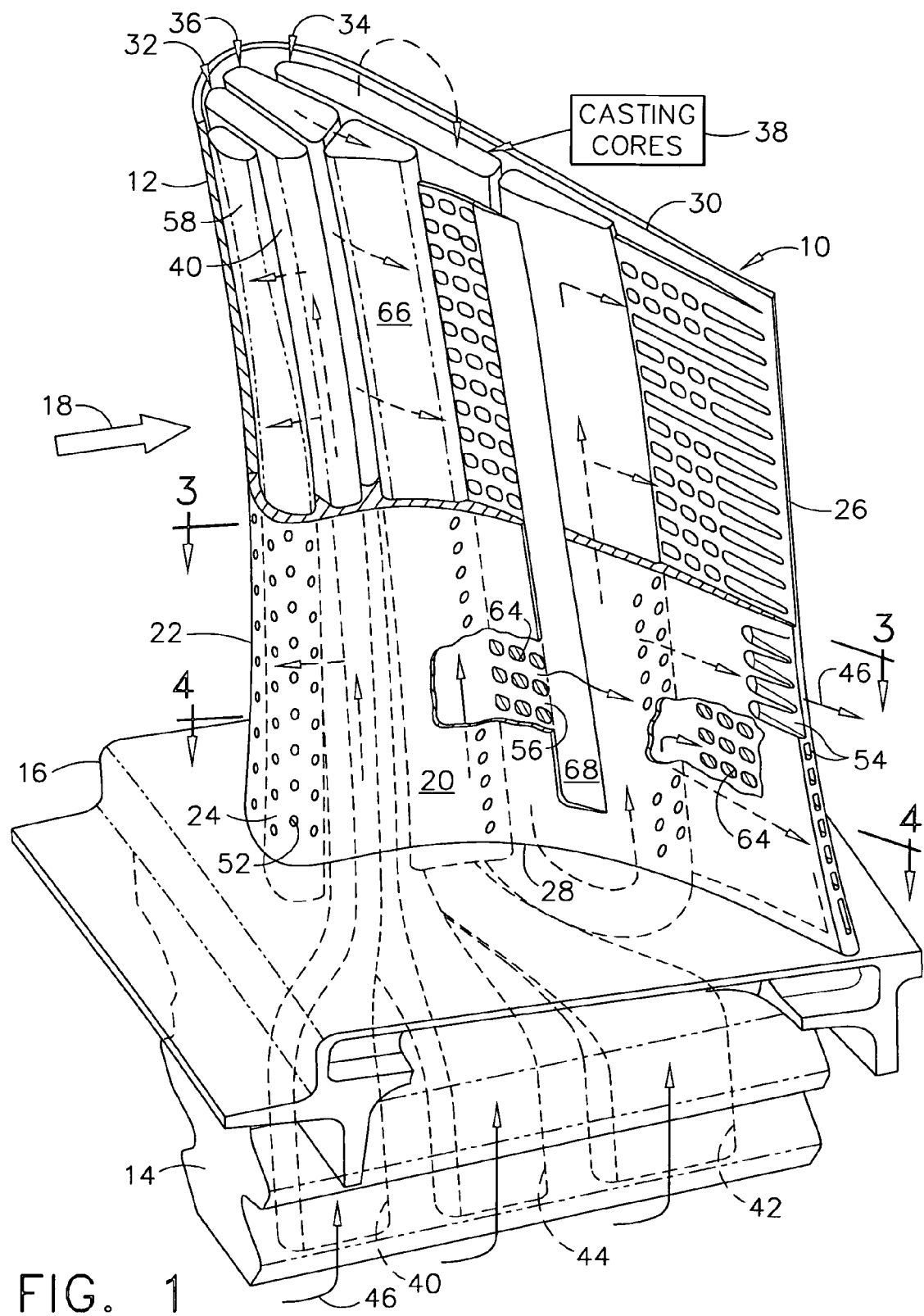
FIG. 1 is a partly sectional, isometric view of a first stage turbine rotor blade having three cooling circuits therein.

Illustrated in FIG. 1 is a first stage turbine rotor blade 10 for use in the high pressure turbine (HPT) of a gas turbine engine, such as a turbofan aircraft engine. The blade includes an airfoil 12 integrally joined to a supporting dovetail 14 at a flow bounding platform 16 radially therebetween. The blade may be made by conventional casting methods using conventional superalloy materials, such as nickel or cobalt based metals.

The airfoil has a suitable aerodynamic profile for extracting energy from hot combustion gases 18 provided during operation from an annular combustor (not shown), and as guided by a conventional HPT turbine nozzle (not shown).

The platform 16 defines a portion of the inner flow boundary for the combustion gases. And, the dovetail 14 has a typical lobed configuration for being retained in a complementary dovetail slot in the perimeter of the supporting turbine rotor disk (not shown).

Figure 2:
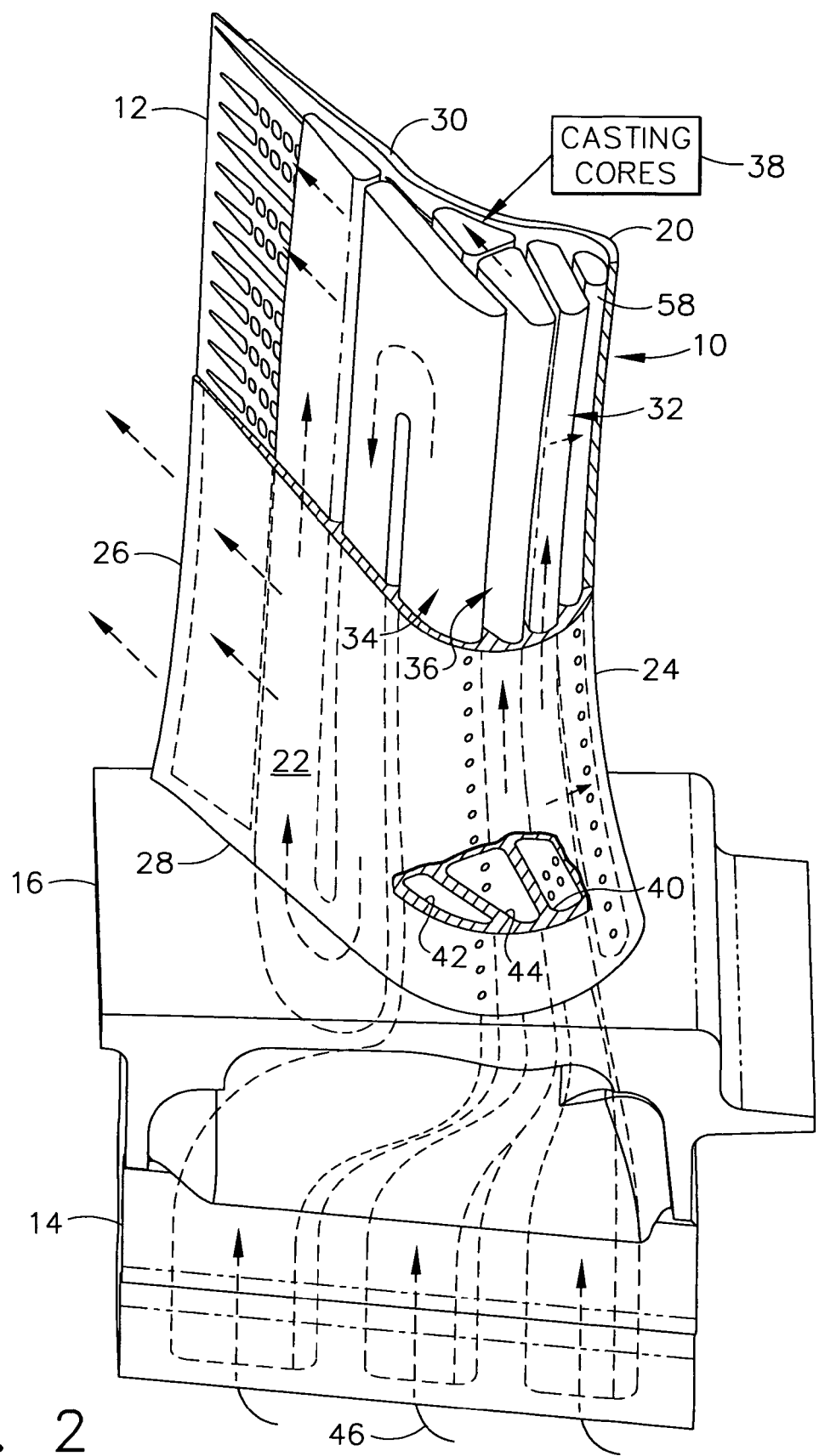
FIG. 2 is a partly sectional, isometric view of the opposite suction side of the blade illustrated in FIG. 1.

FIGS. 1 and 2 illustrate the circumferentially opposite pressure and suction sidewalls 20,22 of the airfoil which extend axially or chordally between opposite leading and trailing edges 24,26. The opposite sidewalls also extend in radial span between a radially inner root 28 at the platform, to a radially outer tip 30.

The airfoil illustrated in FIGS. 1 and 2 is hollow and includes three independent internal cooling circuits 32,34,36 extending in radial span therein. The circuits are defined by hollow passages extending radially through the blade which are conventionally created by casting using corresponding ceramic cores 38 shown in the exposed outer sections of the airfoils illustrated in FIGS. 1 and 2.

Figure 3:
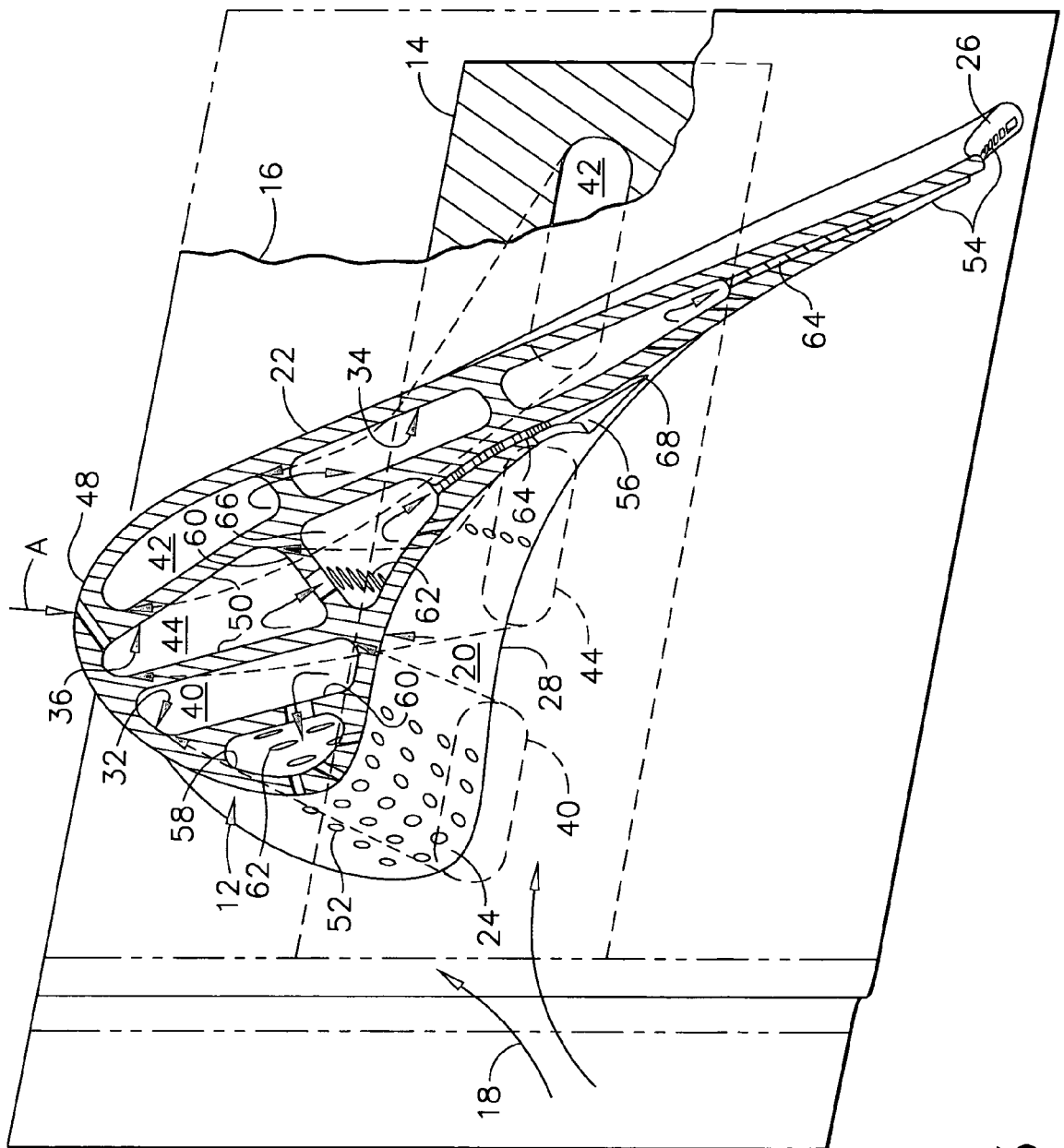
FIG. 3 is a radial sectional view through the airfoil illustrated in FIG. 1 and taken along line 3—3.
Figure 4:
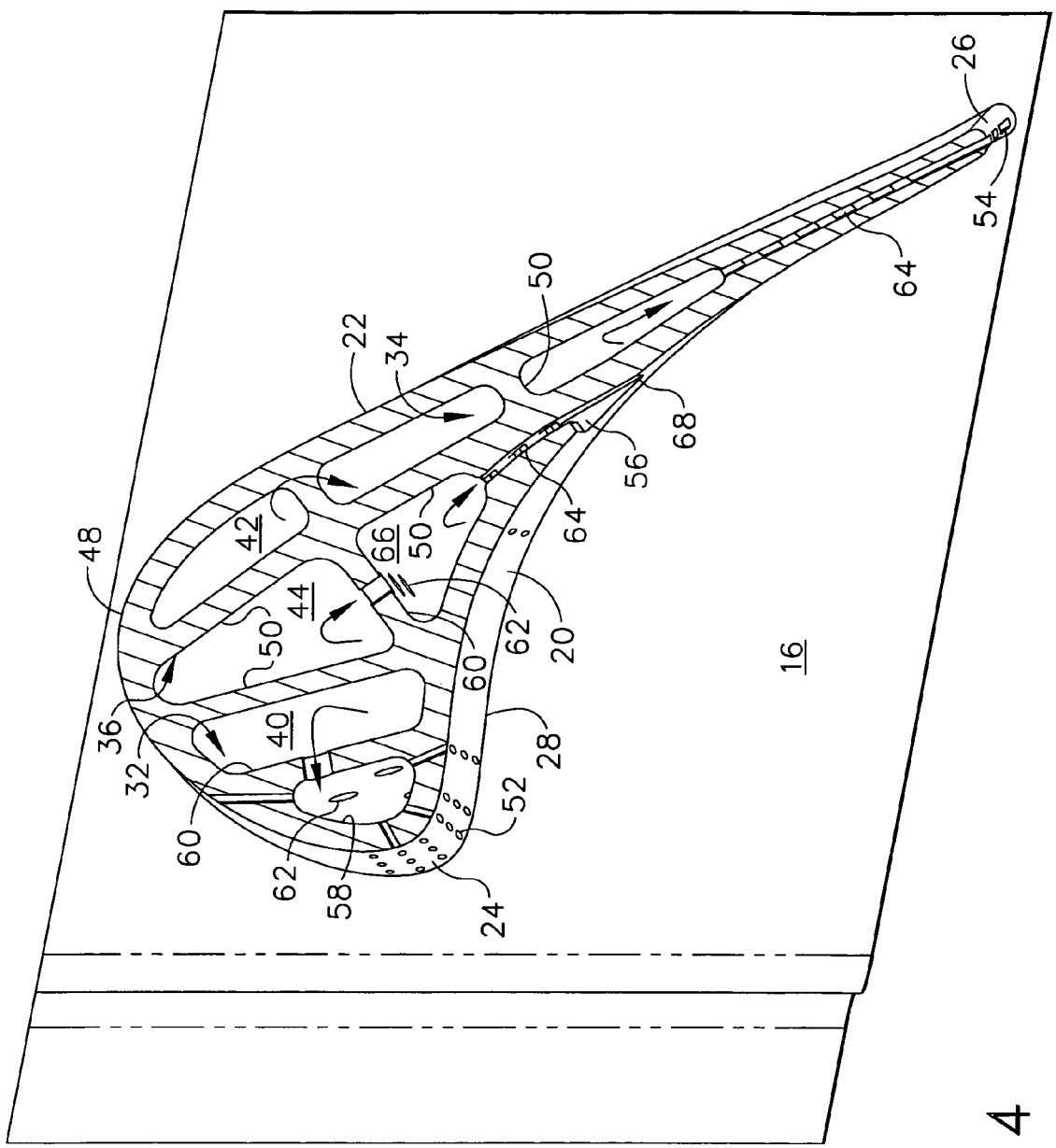
FIG. 4 is another radial sectional view through the airfoil of FIG. 1 and taken along line 4—4.

During conventional casting of the blades, the solid cores result in the hollow passages of the cooling circuits, and, therefore, the cores in the figures represent the boundaries of the corresponding cooling circuits. The spaces between and around the several cores are filled with molten metal which forms the final airfoil after the casting process is complete. FIGS. 3 and 4 illustrate two exemplary radial sections of the airfoil with the corresponding cooling circuits therein bounded by the cast metal.

As initially shown in FIGS. 1 and 2, the three circuits have respective radial inlet channels 40,42,44 commencing in axially adjacent stack-up or alignment in the lower base surface of the dovetail 14 for receiving cooling air 46, such as compressor discharge air, from a multistage axial compressor (not shown). The inlet channels 40,42,44 then twist together from the base of the dovetail, through the platform 16, and into the airfoil behind the leading edge in transverse adjacent alignment across or between the pressure and suction sidewalls 20,22.

FIG. 3 illustrates the initial axial alignment of the three inlet channels 40,42,44 in the dovetail 14 which then twist to conform with the angular position or twist of the airfoil extending radially outwardly from the platform 16. The radially outer ends of the three inlet channels 40,42,44 adjoin each other in a transverse or circumferential alignment skewed from the axial orientation of the dovetail.

A significant advantage of the triple adjoining inlet channels 40,42,44 is their ability to collectively channel all of the incoming cooling air 46 along the same region of the airfoil for substantially lowering the bulk temperature thereof.

More specifically, the exemplary airfoil 12 illustrated in FIG. 3 has a suitable aerodynamic profile which increases in thickness between the opposite sidewalls from the leading edge 24 to a hump 48 of maximum transverse thickness A behind the leading edge, typically measured by the diameter of an inscribed circle therein. From the hump 48 the thickness of the airfoil radial section decreases to the thin or narrow trailing edge 26 of minimum thickness. The three inlet channels are preferentially stacked together across the maximum thickness hump region 48 of the airfoil and provide locally enhanced cooling thereof.

As shown in FIGS. 3 and 4, the three cooling circuits 32,34,36 are separated from each other by two internal walls or bridges 50 which are preferably imperforate. The imperforate bridges 50 which separate the three inlet channels 40,42,44 preferably extend transversely between the pressure and suction sidewalls 20,22 for locally cooling the hump 48 using the cooling air 46 channeled through the three inlets. In this way, the bridges separating the inlet channels are themselves cooled by the entirety of the incoming cooling air, and since these bridges extend inwardly from the opposite pressure and suction sidewalls they provide an effective heat sink for removing heat during operation.

Since the three inlet channels 40,42,44 and the separating bridges 50 therebetween substantially fill the maximum thickness hump region 48 of the airfoil the full cooling effect of the incoming cooling air may be initially localized in this region for substantially reducing the bulk temperature of the entire airfoil during operation in the hot combustion gas environment.

As shown in the several Figures, the three cooling circuits 32,34,36 preferably radiate laterally outwardly from the hump 48 toward the leading and trailing edges 24,26. In this way, the residual or remaining cooling effect of the inlet air initially channeled in the hump region may then be used for cooling the remaining outboard portions of the airfoil.

The three circuits 32,34,36 illustrated for example in FIG. 3 include respective rows of aperture outlets 52,54,56 extending through corresponding portions of the two sidewalls 20,22 for discharging the spent cooling air therefrom. In particular, each of the cooling circuits is configured for series flow of the cooling air from the respective inlet channels 40,42,44 to the respective outlets 52,54,56 to effect corresponding backflow margins between the cooling air 46 discharged from the outlets and the combustion gases 18 flowable thereover.

As indicated above, the pressure distribution of the combustion gases 18 varies differently over the pressure and suction sides of the airfoil between the leading and trailing edges. A suitable backflow margin over the local pressure of the combustion gases is desired at the various outlets to prevent ingestion of the combustion gases therethrough during operation. For example, the backflow margin may be within the range of about 5%–50%.

The cooling air 46 initially introduced through the three inlet channels 40,42,44 has maximum pressure, with the pressure in the three circuits decreasing differently therethrough in view of the different configurations thereof. The different configurations of the cooling circuits may be used to advantage for better matching the internal pressure of the cooling air to the external pressure of the combustion gases for maintaining acceptable backflow margins, without undesirable excess.

The three cooling circuits initially illustrated in FIGS. 1 and 2 include a first cooling circuit 32 terminating along the leading edge 24; a second cooling circuit 34 terminating along the trailing edge 26; and a third or middle cooling circuit 36 terminating chordally between the first and second circuits. In this way, the first circuit 32 may be used for dedicated cooling of the leading edge region of the airfoil. The second circuit 34 may be used for dedicated cooling of the trailing edge, as well as cooperating with the third circuit 36 for cooling of the midchord region of the airfoil.

The three cooling circuits may have various configurations within the available space provided in their respective portions of the airfoil. For example, the first circuit 32 also includes a first or leading edge outlet channel 58 as shown in FIGS. 3 and 4 which extends in radial span directly behind the leading edge 24. The first outlet channel 58 is separated from the first inlet channel 40 by a perforate cold wall or bridge 60 to provide impingement cooling of the inside of the leading edge 24 in a conventional manner.

In another example, two rows of impingement holes 62 may be provided in the perforate bridge 60 for discharging cooling air from the first inlet channel 40 into the first outlet channel 58, for in turn being discharged through the several rows of first outlets 52 configured in conventional film cooling arrangements.

In yet another example, the pressure and suction sidewalls 20,22 around the leading edge 24 may include seven rows of corresponding film cooling first outlets 52 staggered in span from each other for discharging the spent impingement air from the first cooling circuit 32 with a corresponding backflow margin around the leading edge. The pressure losses in discharging the cooling air through the two-channel first circuit 32 are minimized for ensuring an adequate backflow margin around the leading edge.

The second cooling circuit 34 illustrated in the airfoil shown in FIG. 3 is in the preferred form of a three-pass serpentine circuit extending along the suction sidewall 22 from the second inlet channel 42 at the hump 48 to the row of second outlets 54 along the trailing edge 26. The serpentine circuit cools the suction side of the airfoil and accumulates pressure losses in the cooling air. And, the spent cooling air is discharged through the second outlets 54, some of which extend through the trailing edge 26 itself as shown in FIG. 4, and some of which terminate in slots immediately upstream of the trailing edge along the pressure side as shown in FIG. 3.

The various cooling circuits, including the third circuit, preferably include elongate turbulators (not shown) along the inner surfaces of the pressure and suction sidewalls for enhancing heat transfer of the cooling air, while also introducing additional pressure losses. The spent cooling air discharged from the trailing edge second outlets 54 have reduced pressure and therefore effect a corresponding backflow margin with the lower pressure combustion gases flowing past the trailing edge during operation.

In the preferred embodiment illustrated in FIGS. 1 and 3, the second circuit 34 terminates in a two-dimensional array of turbulator pins 64 which effect a local mesh with enhanced heat transfer. The cooling air extracts heat as it flows in the passages formed between the pins prior to discharge through the trailing edge outlets 54.

The third circuit 36 illustrated in FIG. 3 is therefore disposed chordally or axially between the first and second circuits 32,34, and extends transversely from the suction sidewall 22 to the pressure sidewall 20.

In the preferred embodiment illustrated in FIG. 3 the third circuit 36 further includes a third or midchord outlet channel 66 extending in radial span along the pressure sidewall 20. The third outlet channel 66 is separated from the corresponding third inlet channel 44 by another perforate bridge 60 including a single row of impingement holes 62 therein for providing impingement cooling of the pressure sidewall prior to discharge through the third outlets 56. Like the leading edge cooling circuit, the midchord cooling circuit 36 provides impingement cooling of the inner surface of the pressure sidewall prior to discharge in a film of cooling air along the outer surface of the pressure sidewall.

Like the trailing edge cooling circuit 34, the midchord cooling circuit 36 similarly terminates in a two-dimensional array of turbulator pins 64 including the corresponding third aperture outlets 56 defined therebetween along the pressure sidewall 20. In this way, the spent impingement air from the outlet channel 66 is additionally used for cooling the mesh region of the pressure sidewall defined by the turbulator pins prior to discharge in a film along the pressure sidewall.

The airfoil illustrated in FIGS. 1 and 3 preferably also includes a common radial slot 68 extending in radial span along the pressure sidewall 20 and joined in flow communication with the third outlets 56 defined by the spaces of the last row of turbulator pins. In this way, the spent cooling air collects in the common slot 68 and is diffused prior to discharge in a common film of cooling air extending aft along the pressure sidewall to the trailing edge for providing enhanced cooling thereof.

The three cooling circuits 32,34,36 described above both cooperate with each other, and have different configurations for differently cooling the different portions of the airfoil with corresponding backflow margins. The two exemplary perforate bridges 60 permit impingement cooling of local portions of the pressure sidewall, while also providing cold internal bridges for reducing the bulk temperature of the airfoil.

Similarly, the various imperforate bridges 50 separate the three circuits from each other and provide internal cold bridges for also reducing the bulk temperature of the airfoil. Additional ones of the imperforate bridges 50 are used to define the three channels or legs of the serpentine circuit 34 and also effect cold bridges therein. In particular, one of the imperforate bridges 50 as illustrated in FIG. 3 joins the suction sidewall 22 to the back side of the second array of pins 64 for providing an additional heat conduction path for removing heat from the pressure sidewall and the corresponding heat conducting pins 64.

The multiple channels provided by the three cooling circuits may be manufactured in the turbine airfoil using the corresponding ceramic cores 38 in an otherwise conventional lost wax casting process. The three circuits may initially have corresponding ceramic cores suitably joined to each other for the casting process. Or, the leading edge and middle circuits 32,36 may be formed with a common ceramic core fixedly assembled with a separate ceramic core for the serpentine trailing edge circuit 34 for the casting process.

Whereas the internal impingement holes 62 are cast with the airfoil, the various external holes through the pressure and suction sides of the airfoil may be formed after casting using any conventional drilling or other forming process.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
   an airfoil having opposite pressure and suction sidewalls extending chordally between opposite leading and trailing edges and in span between a root and a tip;
   a supporting dovetail integrally joined to said airfoil root at a platform; and
   said airfoil further including three internal cooling circuits separated from each other by imperforate bridges and extending in span therein, and each circuit includes a respective inlet channel commencing in axially adjacent alignment in said dovetail and twisting together through said platform into said airfoil behind said leading edge and in transverse adjacent alignment between said pressure and suction sidewalls.

2. A blade according to claim 1 wherein:
   said airfoil further comprises an aerodynamic profile increasing in thickness from said leading edge to a hump of maximum thickness therebehind, and decreasing in thickness therefrom to said trailing edge; and
   said three inlet channels are stacked together across said hump.

3. A blade according to claim 2 wherein said three cooling circuits radiate outwardly from said hump toward said leading and trailing edges.

4. A blade according to claim 3 wherein:
   said three cooling circuits include respective rows of aperture outlets extending through said sidewalls; and
   each of said circuits is configured for series flow of said cooling air from said inlet channels to said outlets to effect corresponding backflow margins between said cooling air discharged from said outlets and combustion gases flowable thereover.

5. A blade according to claim 4 wherein said three cooling circuits comprise:
   a first cooling circuit including a first outlet channel extending in span directly behind said leading edge, and separated from a corresponding first inlet channel by a perforate bridge to provide impingement cooling of said leading edge; and
   said pressure and suction sidewalls around said leading edge include rows of corresponding first film cooling outlets for discharging spent impingement air therefrom with a corresponding backflow margin.

6. A blade according to claim 5 wherein said three cooling circuits further comprise a second serpentine cooling circuit extending along said suction sidewall from a corresponding second inlet channel to a corresponding row of second outlets along said trailing edge for discharging spent cooling air therefrom with a corresponding backflow margin.

7. A blade according to claim 6 wherein said three cooling circuits further comprise a third cooling circuit disposed between said first and second cooling circuits, and extending transversely from said suction sidewall to said pressure sidewall.

8. A blade according to claim 7 wherein said third cooling circuit further comprises a third outlet channel extending in span along said pressure sidewall, and separated from a corresponding third inlet channel by a perforate bridge to provide impingement cooling of said pressure sidewall prior to discharge through corresponding third aperture outlets along said pressure sidewall.

9. A blade according to claim 8 wherein said second cooling circuit comprises a three-pass serpentine circuit.

10. A blade according to claim 9 wherein:
    said second cooling circuit terminates in an array of pins prior to discharge through said second outlets; and
    said third cooling circuit terminates in an array of pins including therebetween said third aperture outlets along said pressure sidewall.

11. A turbine blade comprising:
    an airfoil having opposite pressure and suction sidewalls extending chordally between opposite leading and trailing edges and in span between a root and a tip;
    a supporting dovetail integrally joined to said airfoil root at a platform; and
    said airfoil further including three internal cooling circuits extending in span therein, and each circuit includes a respective inlet channel commencing in axially adjacent alignment in said dovetail and twisting together through said platform into said airfoil behind said leading edge and in transverse adjacent alignment between said pressure and suction sidewalls.

12. A blade according to claim 11 wherein:
    said airfoil further comprises an aerodynamic profile increasing in thickness from said leading edge to a hump of maximum thickness therebehind, and decreasing in thickness therefrom to said trailing edge; and
    said three inlet channels are stacked together across said hump.

13. A blade according to claim 12 wherein said three cooling circuits are separated from each other by internal bridges, and bridges separating said three inlet channels extend transversely between said pressure and suction sidewalls for locally cooling said hump using cooling air channeled through said three inlet channels.

14. A blade according to claim 13 wherein said three cooling circuits radiate outwardly from said hump toward said leading and trailing edges.

15. A blade according to claim 14 wherein:
    said three cooling circuits include respective rows of aperture outlets extending through said sidewalls; and
    each of said circuits is configured for series flow of said cooling air from said inlet channels to said outlets to effect corresponding backflow margins between said cooling air discharged from said outlets and combustion gases flowable thereover.

16. A blade according to claim 15 wherein said three cooling circuits comprise first, second, and third cooling circuits respectively terminating along said leading edge, trailing edge, and chordally therebetween.

17. A blade according to claim 16 wherein:
    said first cooling circuit further comprises a first outlet channel extending in span directly behind said leading edge, and separated from a corresponding first inlet channel by a perforate bridge to provide impingement cooling of said leading edge; and said pressure and suction sidewalls around said leading edge include rows of corresponding first film cooling outlets for discharging spent impingement air therefrom with a corresponding backflow margin.

18. A blade according to claim 16 wherein said second cooling circuit comprises a serpentine circuit extending along said suction sidewall from a corresponding second inlet channel to a corresponding row of second outlets along said trailing edge for discharging spent cooling air therefrom with a corresponding backflow margin.

19. A blade according to claim 18 wherein said second cooling circuit comprises a three-pass serpentine circuit.

20. A blade according to claim 19 wherein said second cooling circuit terminates in an array of pins prior to discharge through said second outlets.

21. A blade according to claim 16 wherein said third cooling circuit is disposed between said first and second cooling circuits, and extends transversely from said suction sidewall to said pressure sidewall.

22. A blade according to claim 21 wherein said third cooling circuit terminates in an array of pins including corresponding third aperture outlets along said pressure sidewall.

23. A blade according to claim 22 wherein said airfoil includes a slot extending in span along said pressure sidewall and joined in flow communication with said third outlets.

24. A blade according to claim 21 wherein said third cooling circuit further comprises a third outlet channel extending in span along said pressure sidewall, and separated from a corresponding third inlet channel by a perforate bridge to provide impingement cooling of said pressure sidewall prior to discharge through corresponding third aperture outlets along said pressure sidewall.

25. A blade according to claim 21 wherein said three cooling circuits are separated from each other by imperforate bridges.

* * * * *